(12) United States Patent
Brassard

(10) Patent No.: US 10,208,777 B1
(45) Date of Patent: Feb. 19, 2019

(54) BRACKET FOR HOLDING AND LOCKING TABLET-TYPE ELECTRONIC DEVICES OF VARIOUS SIZES SECURELY

(71) Applicant: ARKON RESOURCES, INC., Arcadia, CA (US)

(72) Inventor: Paul Brassard, Arcadia, CA (US)

(73) Assignee: ARKON RESOURCES, INC., Arcadia, CA (US)

( * ) Notice: Subject to any disclaimer, the term of this patent is extended or adjusted under 35 U.S.C. 154(b) by 0 days.

(21) Appl. No.: 15/890,554

(22) Filed: Feb. 7, 2018

(30) Foreign Application Priority Data

Dec. 1, 2017 (TW) .............................. 106142261 A

(51) Int. Cl.
| | | |
|---|---|---|
| *F16M 11/00* | (2006.01) | |
| *F16B 2/12* | (2006.01) | |
| *F16M 13/02* | (2006.01) | |
| *G06F 1/16* | (2006.01) | |
| *E05B 65/00* | (2006.01) | |

(52) U.S. Cl.
CPC .............. *F16B 2/12* (2013.01); *F16M 13/022* (2013.01); *G06F 1/1632* (2013.01); *E05B 65/00* (2013.01); *G06F 1/1626* (2013.01)

(58) Field of Classification Search
CPC ....... F16M 13/02; F16M 13/022; H01R 33/97
See application file for complete search history.

(56) References Cited

U.S. PATENT DOCUMENTS

| | | | | |
|---|---|---|---|---|
| 8,833,716 B2* | 9/2014 | Funk | ...................... | F16M 13/02 248/309.1 |
| 9,022,337 B2* | 5/2015 | Petruskavich | ....... | F16M 11/041 248/176.1 |
| 2004/0240167 A1* | 12/2004 | Ledbetter | ............... | F16M 11/22 361/679.31 |
| 2009/0270727 A1* | 10/2009 | Zhao | ........................ | A61B 8/00 600/437 |

* cited by examiner

*Primary Examiner* — Amy J. Sterling
(74) *Attorney, Agent, or Firm* — Bacon & Thomas, PLLC

(57) ABSTRACT

A bracket for holding and locking tablet-type electronic devices of various sizes securely includes a bracket base, two horizontally clamping members, and a vertically clamping member. The front side of the bracket base includes two horizontal rail grooves, which are adjacent to the bottom side of the bracket base and to two corresponding lateral edges of the bracket base respectively, and a vertical rail groove, which is adjacent to the top side and the center of the bracket base. Each horizontally clamping member can be inserted horizontally into the corresponding horizontal rail groove to any depth desired and then fixed in position. The vertically clamping member can be inserted vertically into the vertical rail groove to any depth desired and then fixed in position. Each of the clamping members is adjustable in position to adapt to the size of the tablet-type electronic device to be supported on the bracket.

18 Claims, 12 Drawing Sheets

BRACKET FOR HOLDING AND LOCKING TABLET-TYPE ELECTRONIC DEVICES OF VARIOUS SIZES SECURELY

FIELD OF THE INVENTION

The present invention relates to a bracket for tablet-type electronic devices. More particularly, the invention relates to a bracket for holding and locking tablet-type electronic devices of various sizes securely, wherein: the bracket has an inverted T-shaped base; two horizontally clamping members are horizontally and movably provided on the front side of the bracket base and are adjacent to the bottom side of the bracket base and to two corresponding lateral edges of the bracket base respectively; a vertically clamping member is vertically and movably provided on the front side of the bracket base and is adjacent to the top side and the center of the bracket base; each of the horizontally clamping members is fixedly mounted with at least one horizontally blocking front member, whose position is arbitrarily adjustable; the vertically clamping member is fixedly mounted with at least two vertically blocking front members, whose positions are also arbitrarily adjustable; and when it is desired to support a tablet-type electronic device with the bracket, the positions of the horizontally blocking front members are adjusted first, in order for the horizontally blocking front members to hold two corresponding front portions of the bottom edge of the tablet-type electronic device (e.g., a bottom-left front edge portion and a bottom-right front edge portion) respectively, and then the vertical distance from the vertically blocking front members to the horizontally blocking front members is adjusted until a perfect match with the vertical height of the tablet-type electronic device is obtained, allowing the vertically blocking front members to hold the top edge and the top front edge of the tablet-type electronic device, thus making it possible for tablet-type electronic devices of different sizes to be positioned securely on the bracket regardless of their vertical heights, horizontal widths, or thicknesses in the fore-and-aft direction in order to be used stably and safely in any challenging environment (e.g., over a bumpy terrain, in a vigorously shaking state, or in stormy seas).

BACKGROUND OF THE INVENTION

Recently, the maturing of electronic device production processes has lowered the manufacturing costs of various electronic devices and led to increasingly compact designs. Moreover, there has been a trend for electronic devices to diversify in function. For example, tablet computers, PDAs, mobile phones, digital picture frames, and other tablet-type electronic devices that are widely used nowadays are generally configured not only for such common functions as data input and storage, computation, communication, and graphical display, but also for displaying multimedia images like those of an electronic book. This explains why these advantageously inexpensive, versatile, and compact electronic devices have been in extensive use, and become indispensable tools, in our daily lives and at work.

Generally speaking, one who uses a tablet-type electronic device to display an electronic book or multimedia file would hold the body of the electronic device with one hand for as long as needed, during which time the user can adjust the inclination angle of the device body by rotating the corresponding arm or wrist in order to view the images displayed on the screen of the device body from a proper viewing angle with respect to the screen. If the force with which the user's arm or wrist supports the device body is adjusted intermittently or is unsteady such that the device body is shaken, the user will be unable to watch and focus on the displayed images, if not feeling annoyed or eye strain, the latter of which may develop into visual impairment. To prevent the aforesaid problems, the user must hold the device body firmly and persistently against shaking while viewing the images, and it follows that the muscles in the hand, wrist, elbow, or arm in use will be tense, rigid, or otherwise uncomfortable.

As a solution, the inventor of the present invention designed a conventional bracket 1 for holding and locking a tablet-type electronic device, as shown in FIGS. 1 and 2. The conventional bracket 1 can be mounted on a plane (e.g., a tabletop) or an object (e.g., a bicycle frame or the dashboard of a car) in an angularly adjustable manner through a supporting leg (not shown) and is provided with a bracket base 10, two horizontally clamping members 11, and a vertically clamping member 12. The bracket base 10 has an inverted T shape, is horizontally provided with a horizontal displacement groove 101 adjacent to its bottom edge, and is vertically provided with a vertical displacement groove 102 adjacent to its center, wherein the vertical displacement groove 102 is perpendicularly connected to and in communication with the horizontal displacement groove 101. The vertically clamping member 12 is vertically movably mounted at a position corresponding to the vertical displacement groove 102. The two horizontally clamping members 11 are horizontally movably mounted at positions corresponding to the horizontal displacement groove 101 respectively. To support a tablet-type electronic device with the conventional bracket 1, the first step is to adjust the distance between the two horizontally clamping members 11 so that the distance matches the horizontal width of the tablet-type electronic device perfectly. The bottom edge of the tablet-type electronic device is then supported in the horizontal displacement groove 101, with the two horizontally clamping members 11 holding two horizontally corresponding lateral edges (e.g., the left and right edges) of the tablet-type electronic device respectively. After that, the vertical distance from the vertically clamping member 12 to the horizontal displacement groove 101 is adjusted to match the vertical height of the tablet-type electronic device perfectly, allowing the vertically clamping member 12 to hold the top edge of the tablet-type electronic device and thereby position the tablet-type electronic device on the conventional bracket 1.

With continued reference to FIGS. 1 and 2, the vertically clamping member 12 is additionally provided with a locking member 13 on the top side to protect the tablet-type electronic device positioned on the conventional bracket 1 from being easily stolen. The locking member 13 is vertically movably mounted on the vertically clamping member 12 and is provided with a lock 14. Once a tablet-type electronic device is positioned on the conventional bracket 1, with its top edge held by the vertically clamping member 12 or the locking member 13, the lock 14 can be locked such that a lock plate 141 of the lock 14 is engaged in a locking hole 121 of the vertically clamping member 12, and in consequence, the locking member 13 enters a locked state, in which the locking member 13 cannot be vertically moved with respect to the vertically clamping member 12 and thus keeps the tablet-type electronic device from separating from the conventional bracket 1. The locking member 13, therefore, ensures that the tablet-type electronic device will not be easily stolen.

The tablet-type electronic devices on the market, however, come in different sizes. Although the conventional bracket 1 can support tablet-type electronic devices within a certain range of specifications, most of the tablet-type electronic devices that fall outside that range of specifications, in particular those whose thicknesses exceed the predetermined range, cannot be mounted and positioned securely on the conventional bracket 1 (i.e., may get loose from or fall off the conventional bracket 1 and be damaged as a result), if they can be mounted at all.

In addition, market research reveals that the conventional bracket 1 has many drawbacks in use, as detailed below with reference to FIGS. 3 and 4.

1. The conventional bracket 1 has two rows of threaded positioning holes 103 adjacent to two opposite ends of the horizontal displacement groove 101 respectively, and each of the two horizontally clamping members 11 is selectively locked to the desired one of the corresponding row of threaded positioning holes 103 by a screw (not shown). When it is desired to support a tablet-type electronic device with the conventional bracket 1, it is necessary to adjust the distance between the two horizontally clamping members 11 until a perfect match with the horizontal width of the bottom edge of the tablet-type electronic device is obtained, and only then can the bottom edge of the tablet-type electronic device be supported in the horizontal displacement groove 101, with the two horizontally clamping members 11 holding two horizontally corresponding lateral edges (e.g., the left and right edges) of the tablet-type electronic device respectively. If the distance between any two selected threaded positioning holes 103 cannot precisely match the horizontal width of the bottom edge of the tablet-type electronic device, the tablet-type electronic device will not be clamped securely and precisely between the two horizontally clamping members 11 and may wobble between the clamping members 11, causing wear of related parts.

2. Referring again to FIGS. 3 and 4, the conventional bracket 1 is so designed that a tablet-type electronic device is positioned thereon mainly by the locking member 13 at the top edge of the vertically clamping member 12 holding the top edge of the tablet-type electronic device. To enable the conventional bracket 1 to hold tablet-type electronic devices of various thicknesses, it is common practice to provide the locking member 13 with a clamping arm 130 of a relatively great length L, which, however, makes it difficult to hold a relatively thin tablet-type electronic device securely and precisely between the clamping arm 130 of the locking member 13 and the horizontal displacement groove 101. If the top and bottom edges of a tablet-type electronic device to be positioned on the conventional bracket 1 are not pressed securely and precisely by the inner edges of the clamping arm 130 and of the horizontal displacement groove 101 respectively, the tablet-type electronic device is very likely to escape from between the clamping arm 130 and the horizontal displacement groove 101 when the conventional bracket 1 is shaken violently, and the tablet-type electronic device may fall to the ground and end up seriously damaged.

In view of the above, it is an important issue for bracket designers and manufacturers to overcome the foregoing drawbacks of the conventional bracket 1 and develop an improved bracket that not only can adapt to tablet-type electronic devices of various sizes, but also ensures that a tablet-type electronic device positioned on the bracket will lie securely and precisely against the inner edges of the bracket, be they the inner edges corresponding to the vertical height, horizontal width, or thickness of the tablet-type electronic device. The goal is for the bracket and the tablet-type electronic device supported thereon to be safely and stably usable in any challenging environment (e.g., over a bumpy terrain, in a vigorously shaking state, or in stormy seas), without the tablet-type electronic device getting loose or escaping from the bracket. In short, the bracket should be able to ensure the safety of the tablet-type electronic device supported thereon and effectively protect the tablet-type electronic device from wear and damage.

BRIEF SUMMARY OF THE INVENTION

To overcome the aforementioned drawbacks of the conventional brackets, especially the lack of ability to hold and lock tablet-type electronic devices of different sizes securely, the inventor of the present invention conducted extensive research and experiment and finally succeeded in developing a bracket with such ability.

One objective of the present invention is to provide a bracket capable of holding and locking tablet-type electronic device of various sizes securely. The bracket includes a bracket base, two horizontally clamping members, and a vertically clamping member. The bracket base is inverted T-shaped and has a front side and a backside. The front side of the bracket base is concavely provided with two horizontal rail grooves and a vertical rail groove. The horizontal rail grooves are adjacent to the bottom side of the bracket base and to two corresponding lateral edges of the bracket base respectively. The vertical rail groove is adjacent to the top side and the center of the bracket base and is perpendicularly connected to and in communication with the horizontal rail grooves. The backside of the bracket base has a central portion connectable to a supporting leg so that the bracket base can be mounted on a plane (e.g., a tabletop) or an object (e.g., a bicycle frame or the dashboard of a car) in an angularly adjustable manner through the supporting leg. Each of the two horizontally clamping members includes a horizontal rail member, a horizontally positioning post, and a horizontally blocking front member. Each horizontal rail member is provided with a horizontally blocking lateral member at one end. Each horizontal rail member can be inserted horizontally into the corresponding horizontal rail groove to any depth desired and be fixed in the corresponding horizontal rail groove such that the corresponding horizontally blocking lateral member is exposed from one end of the corresponding horizontal rail groove. Each horizontally positioning post is perpendicularly and fixedly provided on the front side of the corresponding horizontal rail member at a position adjacent to the bottom edge of the aforesaid end of the corresponding horizontal rail member. Each horizontally blocking front member can be fitted horizontally over the corresponding horizontally positioning post to any depth desired and be fixed to the corresponding horizontally positioning post. The vertically clamping member includes a vertical rail member, two vertically positioning posts, and two vertically blocking front members. The vertical rail member is horizontally provided with a front blocking arm at one end. The vertical rail member can be inserted vertically into the vertical rail groove to any depth desired and be fixed in the vertical rail groove such that the front blocking arm is exposed from one end of the vertical rail groove. Each vertically positioning post is perpendicularly and fixedly provided on the front side of the front blocking arm at a position adjacent to one end of the front blocking arm. Each vertically blocking front member can be fitted horizontally over the corresponding vertically positioning post to any depth desired and be fixed to the corresponding vertically positioning post.

When it is desired to support a tablet-type electronic device with the bracket, the first step is to adjust the distance between the two horizontally blocking lateral members so that the distance matches the horizontal width of the bottom edge of the tablet-type electronic device perfectly. This allows the two horizontally positioning posts to support the bottom edge of the tablet-type electronic device, the two horizontally blocking lateral members to hold two horizontally corresponding lateral edges (e.g., a bottom-left lateral edge portion and a bottom-right lateral edge portion) of the tablet-type electronic device respectively, and the two horizontally blocking front members to hold two corresponding front portions (e.g., a bottom-left front edge portion and a bottom-right front edge portion) of the tablet-type electronic device respectively. Once the bottom edge of the tablet-type electronic device is supported by the two horizontally positioning posts, and the two corresponding front portions (e.g., the bottom-left front edge portion and the bottom-right front edge portion) of the tablet-type electronic device are held by the two horizontally blocking front members respectively, the vertical distance from the vertically blocking front members to the horizontally blocking front members is adjusted to match the vertical height of the tablet-type electronic device perfectly, in order for the vertically blocking front members to hold the top edge and the top front edge of the tablet-type electronic device. Thus, the bracket not only is adaptable to tablet-type electronic devices of different specifications, but also allows a tablet-type electronic device to lie securely and precisely against the inner edges of the bracket, be they the inner edges corresponding to the vertical height, horizontal width, or thickness of the tablet-type electronic device. This allows the bracket and the tablet-type electronic device supported thereon to be used safely and stably in any challenging environment (e.g., over a bumpy terrain, in a vigorously shaking state, or in stormy seas), without the tablet-type electronic device getting loose or escaping from the bracket. The bracket, therefore, ensures the safety of the tablet-type electronic device supported thereon and effectively protects the tablet-type electronic device from wear and damage.

Another objective of the present invention is to provide the foregoing bracket with the following additional features: the horizontal rail member of each horizontally clamping member is horizontally formed with a lateral-position adjustment slot, and the inner wall of each horizontal rail groove is provided with a bolt fixing base corresponding in position to the corresponding lateral-position adjustment slot. When a tablet-type electronic device is to be supported on the bracket for the first time, the distance between the two horizontally clamping members must be adjusted so that the distance between the two horizontally blocking lateral members matches the horizontal width of the bottom edge of the tablet-type electronic device. Then, two horizontal positioning bolts are respectively passed through the lateral-position adjustment slots and locked to the bolt fixing bases. This allows each horizontal rail member to be inserted horizontally into the corresponding horizontal rail groove to any depth desired and be fixed to the corresponding horizontal rail groove to form a single unit therewith, in order for the two horizontally blocking lateral members to keep a firm hold on two horizontally corresponding lateral edges of the tablet-type electronic device respectively, prevent the tablet-type electronic device from getting loose from the bracket when the tablet-type electronic device is shaken, and thereby ensure that the tablet-type electronic device can be used stably and safely in any challenging environment.

Another objective of the present invention is to provide the foregoing bracket with the following additional features: the corresponding walls of each horizontal rail member and of the corresponding horizontal rail groove are each provided with a meshing surface. When a tablet-type electronic device is to be supported on the bracket for the first time, the distance between the two horizontally clamping members must be adjusted so that the distance between the two horizontally blocking lateral members matches the horizontal width of the bottom edge of the tablet-type electronic device. Then, the two horizontal positioning bolts are respectively passed through the lateral-position adjustment slots and locked to the bolt fixing bases, causing the corresponding meshing surfaces of each horizontal rail member and of the corresponding horizontal rail groove to mesh with each other. This allows each horizontal rail member to be inserted horizontally into the corresponding horizontal rail groove to any depth desired and be fixed to the corresponding horizontal rail groove to form a single unit therewith, in order for the two horizontally blocking lateral members to keep a firm hold on two horizontally corresponding lateral edges of the tablet-type electronic device respectively and prevent the tablet-type electronic device from getting loose from the bracket when the tablet-type electronic device is shaken.

Another objective of the present invention is to provide the foregoing bracket with the following additional features: the backside of the bracket base is protrudingly provided with a lock base adjacent to the aforesaid central portion of the backside of the bracket base, the lock base is provided therein with a lock, the lock is protrudingly provided with a locking press-button extending away from the backside of the bracket base, the locking press-button is retracted into the lock base when pressed with a finger such that a lock plate in the lock is moved toward the front side of the bracket base and exposed from the lock, the vertical rail member is formed with a plurality of locking holes, and the locking holes are vertically arranged and correspond in position to the lock plate. When a tablet-type electronic device is securely positioned on the bracket, the locking press-button can be pressed with a finger in order for the lock plate to move toward the front side of the bracket base, be exposed from the lock, and engage with the corresponding locking hole of the vertical rail member to prevent vertical movement of the front blocking arm and of the vertically blocking front members and to thereby bring the tablet-type electronic device into a locked state, in which the tablet-type electronic device is locked to and inseparable from the bracket and thus protected from being easily stolen.

BRIEF DESCRIPTION OF THE SEVERAL VIEWS OF THE DRAWINGS

The objectives, technical features, and effects of the present invention can be better understood by referring to the following detailed description of some illustrative embodiments in conjunction with the accompanying drawings, in which.

DETAILED DESCRIPTION OF THE INVENTION

Figure 1:
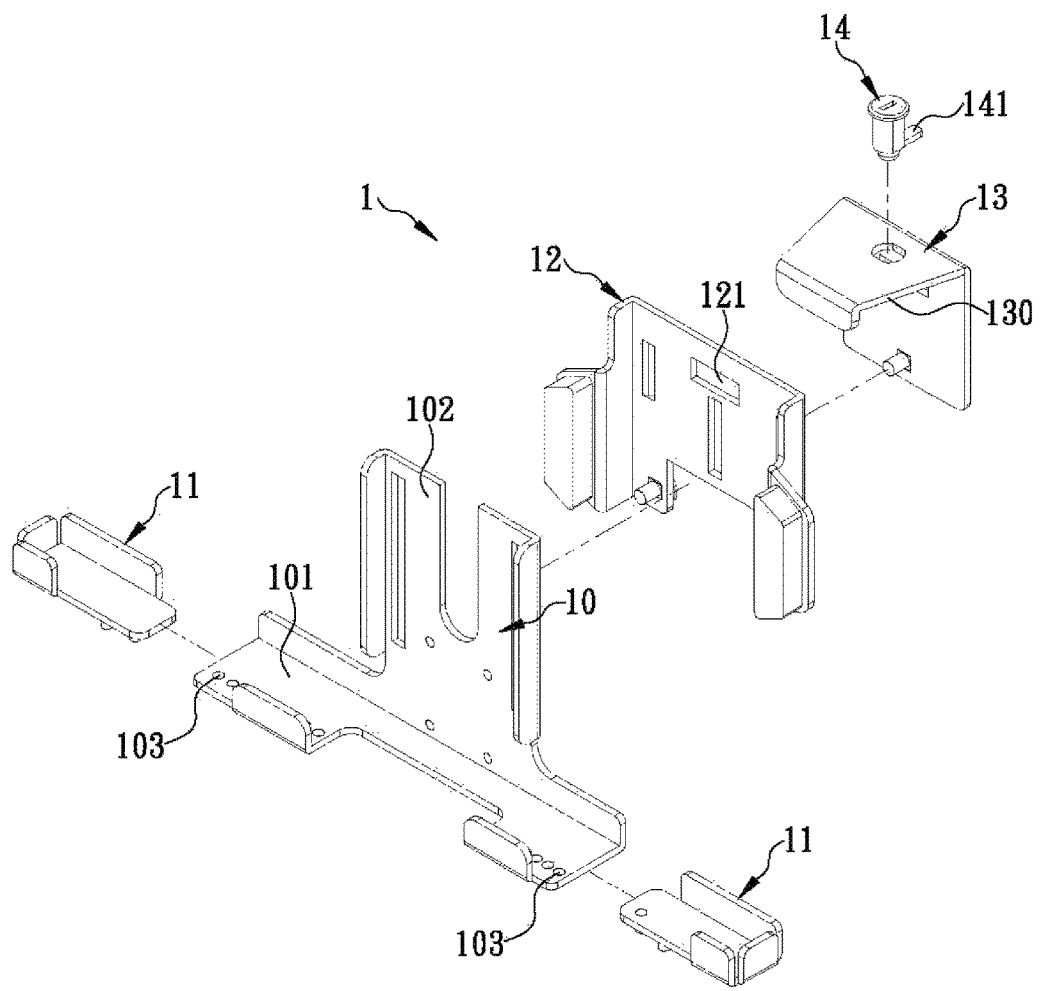
FIG. 1 is an exploded perspective view of a conventional bracket.
Figure 2:
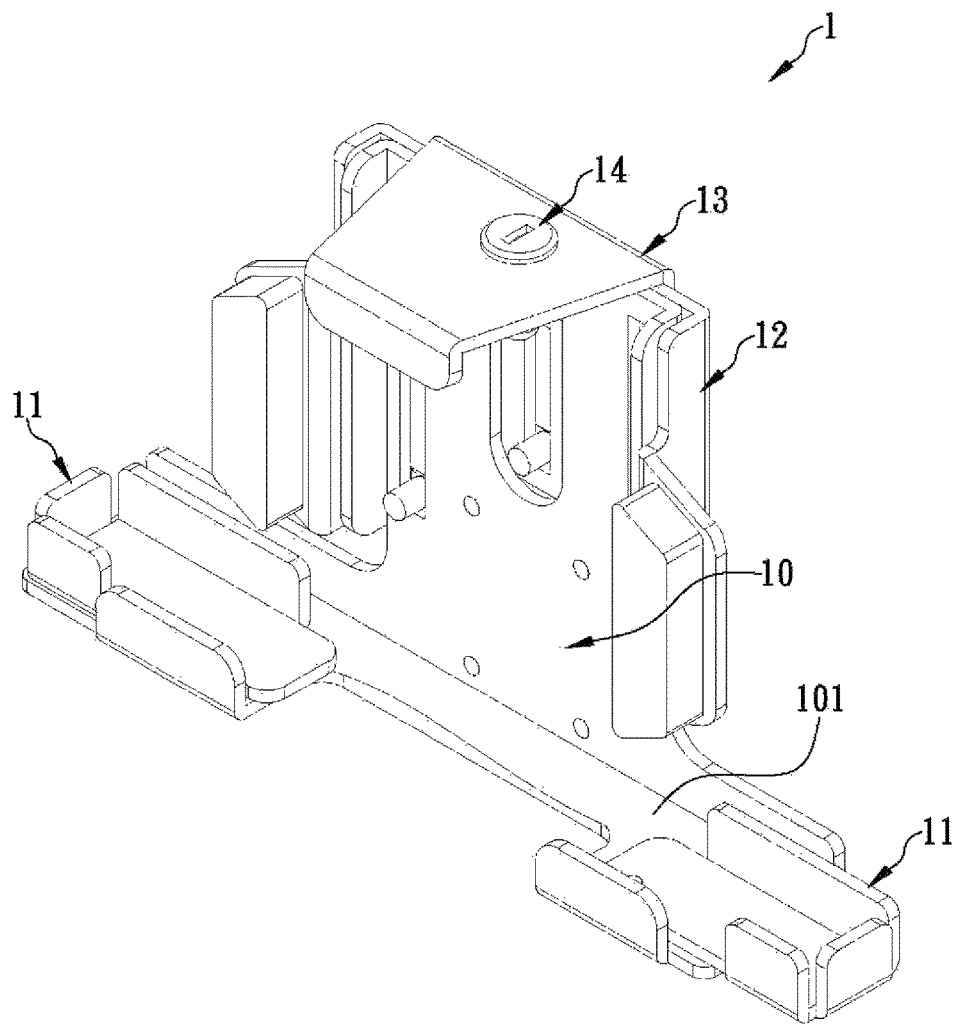
FIG. 2 is an assembled perspective view of the conventional bracket in FIG. 1.
Figure 3:
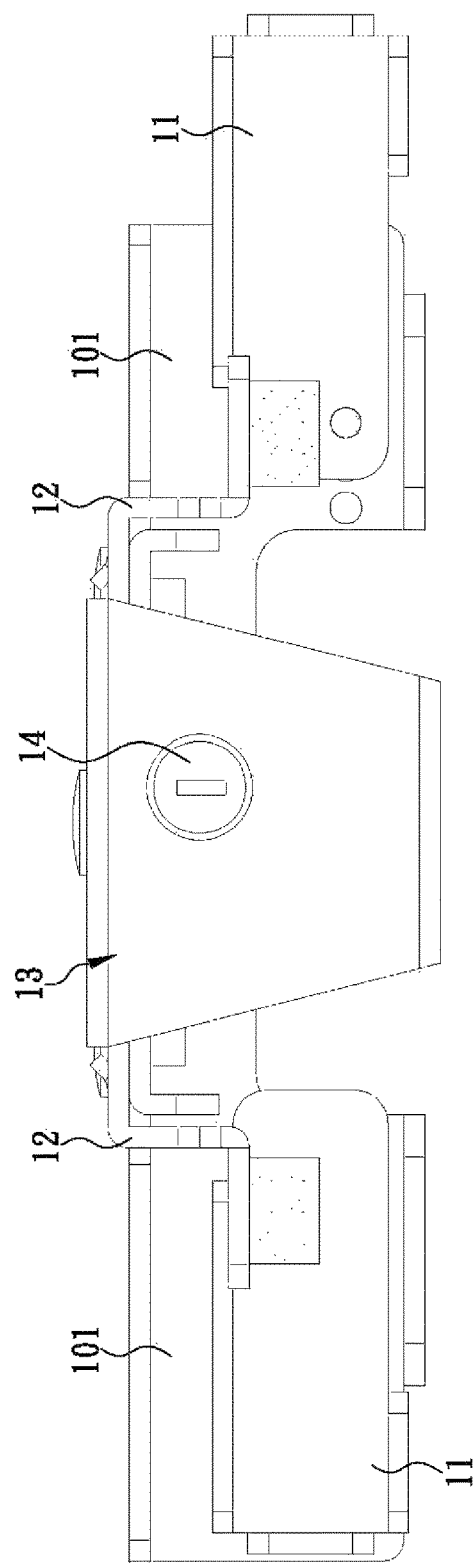
FIG. 3 is an assembled top view of the conventional bracket in FIG. 1.
Figure 4:
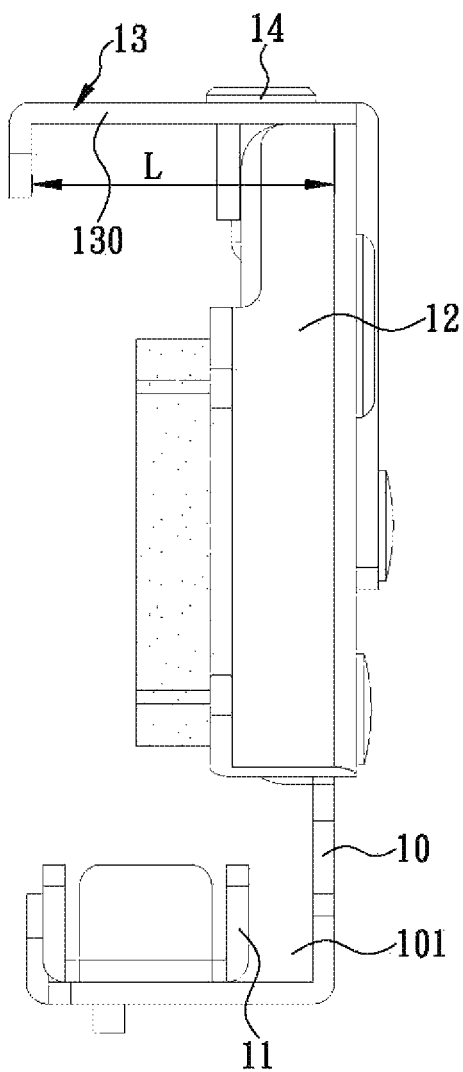
FIG. 4 is an assembled side view of the conventional bracket in FIG. 1.
Figure 5:
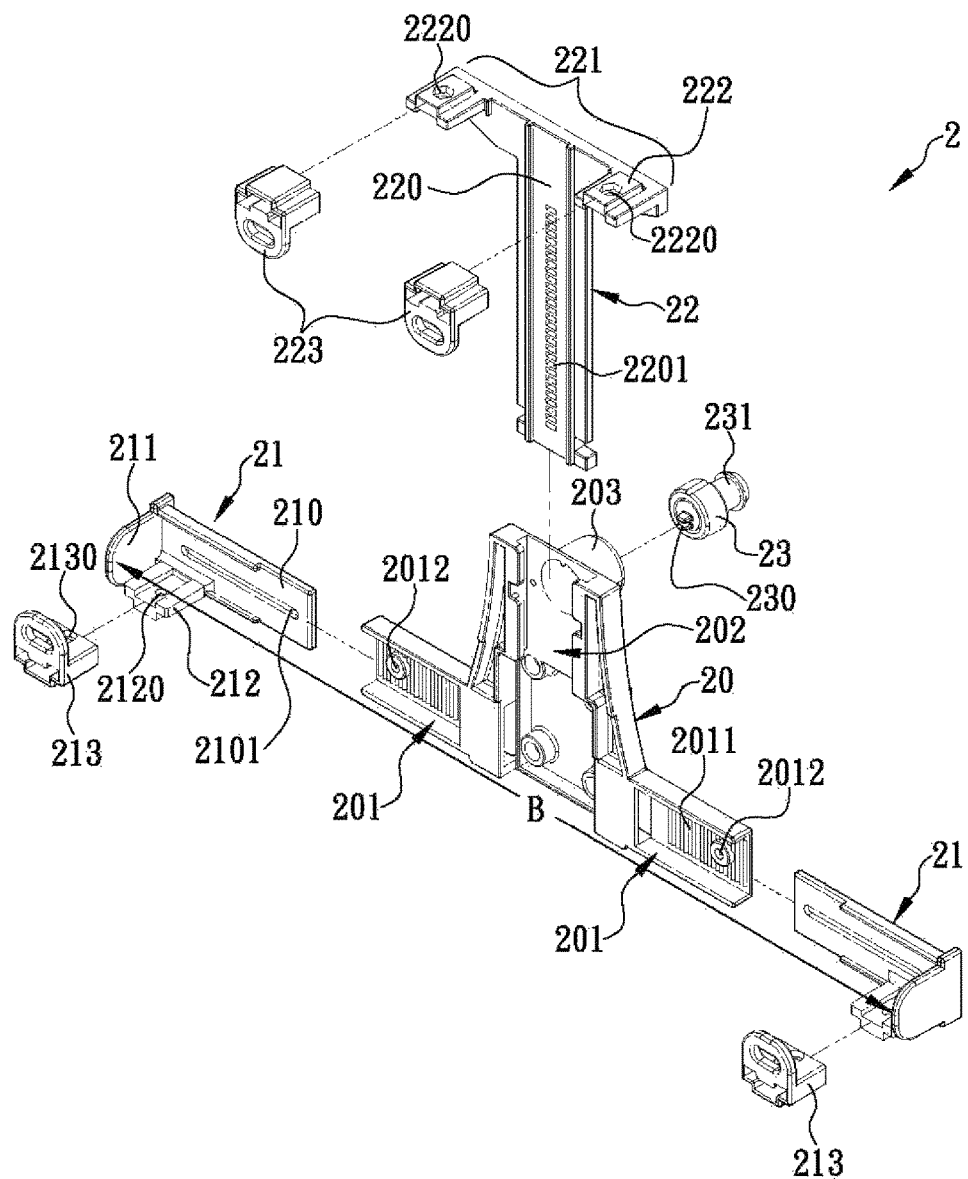
FIG. 5 is an exploded front perspective view of the bracket in a preferred embodiment of the present invention.
Figure 6:
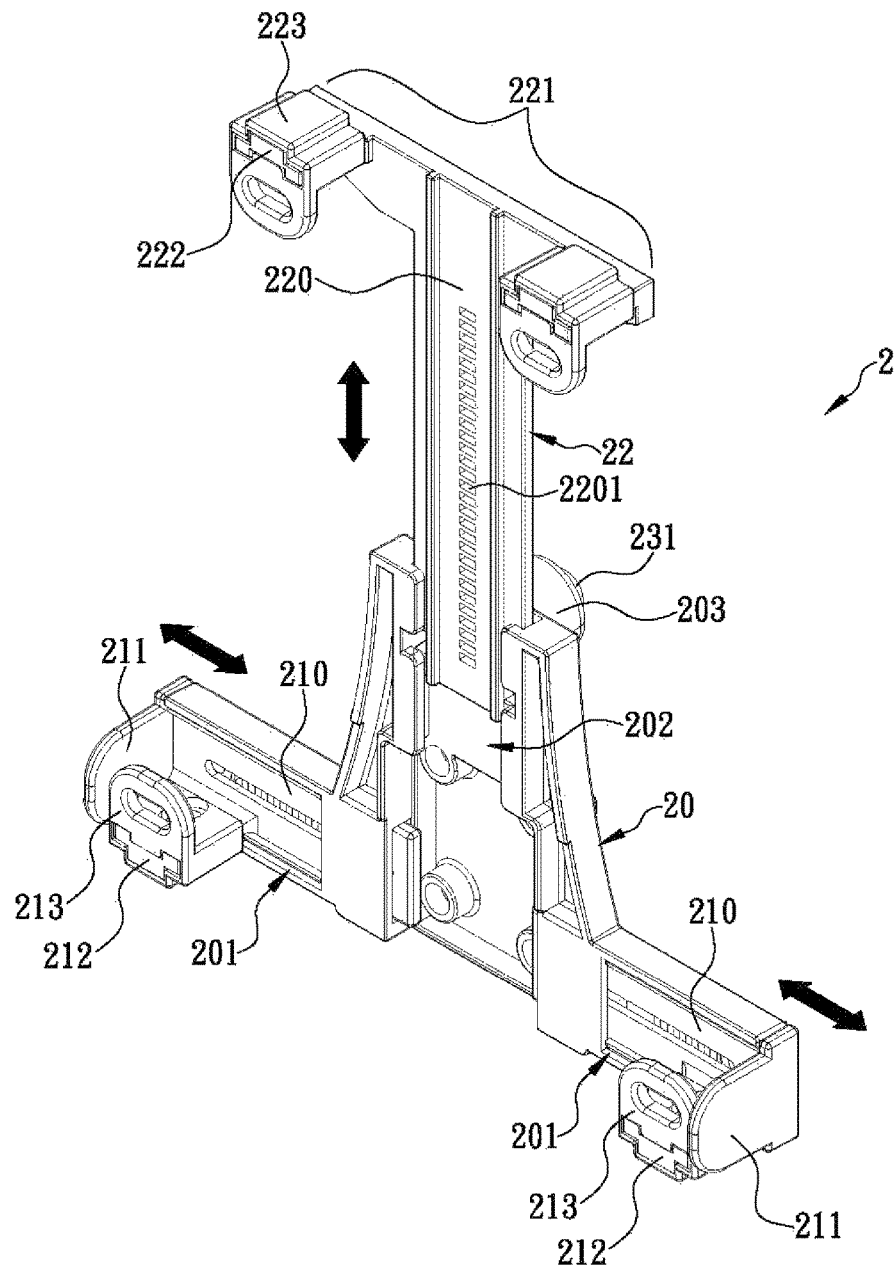
FIG. 6 is an assembled front perspective view of the bracket in FIG. 5.

The present invention provides a bracket for holding and locking tablet-type electronic devices of various sizes securely. In a preferred embodiment of the invention, as shown in FIGS. 5 and 6, the bracket 2 includes a bracket base 20, two horizontally clamping members 21, and a vertically clamping member 22. The bracket base 20 is an inverted T-shaped base. The front side of the bracket base 20 is concavely provided with two horizontal rail grooves 201 and a vertical rail groove 202. The two horizonal rail grooves 201 are adjacent to the bottom side of the bracket base 20 and are respectively adjacent to two corresponding lateral edges of the bracket base 20. The vertical rail groove 202 is adjacent to the top side and the center of the bracket base 20. The vertical rail groove 202 is perpendicularly connected to and in communication with the horizontal rail grooves 201. The backside of the bracket base 20 has a central portion configured to be connected (e.g., threadedly via a plurality of bolts that are not shown) to a supporting leg (not shown) so that the bracket base 20 can be mounted on a plane (e.g., a tabletop) or an object (e.g., a bicycle frame or the dashboard of a car) in an angularly adjustable manner through the supporting leg. In this preferred embodiment, as shown in FIGS. 5 and 6, each horizontally clamping member 21 includes a horizontal rail member 210, a horizontally positioning post 212, and a horizontally blocking front member 213. Each horizontal rail member 210 is provided with a horizontally blocking lateral member 211 at one end and can be inserted horizontally into the corresponding horizontal rail groove 201 to any depth desired and be fixed in the corresponding horizontal rail groove 201, with the horizontally blocking lateral member 211 exposed from one end of the corresponding horizontal rail groove 201. Each horizontally positioning post 212 is perpendicularly and fixedly provided on the front side of the corresponding horizontal rail member 210 and is adjacent to the bottom edge of the end of the corresponding horizontal rail member 210 that is provided with the corresponding horizontally blocking lateral member 211. Each horizontally blocking front member 213 can be fitted horizontally over the corresponding horizontally positioning post 212 to any depth desired and be fixed to the corresponding horizontally positioning post 212.

When it is desired to support a tablet-type electronic device with the bracket 2, the distance between the two horizontally clamping members 21 must be adjusted until the distance B between the two horizontally blocking lateral members 211 matches the horizontal width of the bottom edge of the tablet-type electronic device perfectly, in order for the two horizontally positioning posts 212 and/or the two horizontally blocking front members 213 to support the bottom edge of the tablet-type electronic device, for the two horizontally blocking lateral members 211 to hold two horizontally corresponding lateral edges (e.g., the left and right edges) of the tablet-type electronic device respectively, and for the two horizontally blocking front members 213 to hold two corresponding front portions (e.g., a bottom-left front edge portion and a bottom-right front edge portion) of the tablet-type electronic device respectively.

Figure 7:
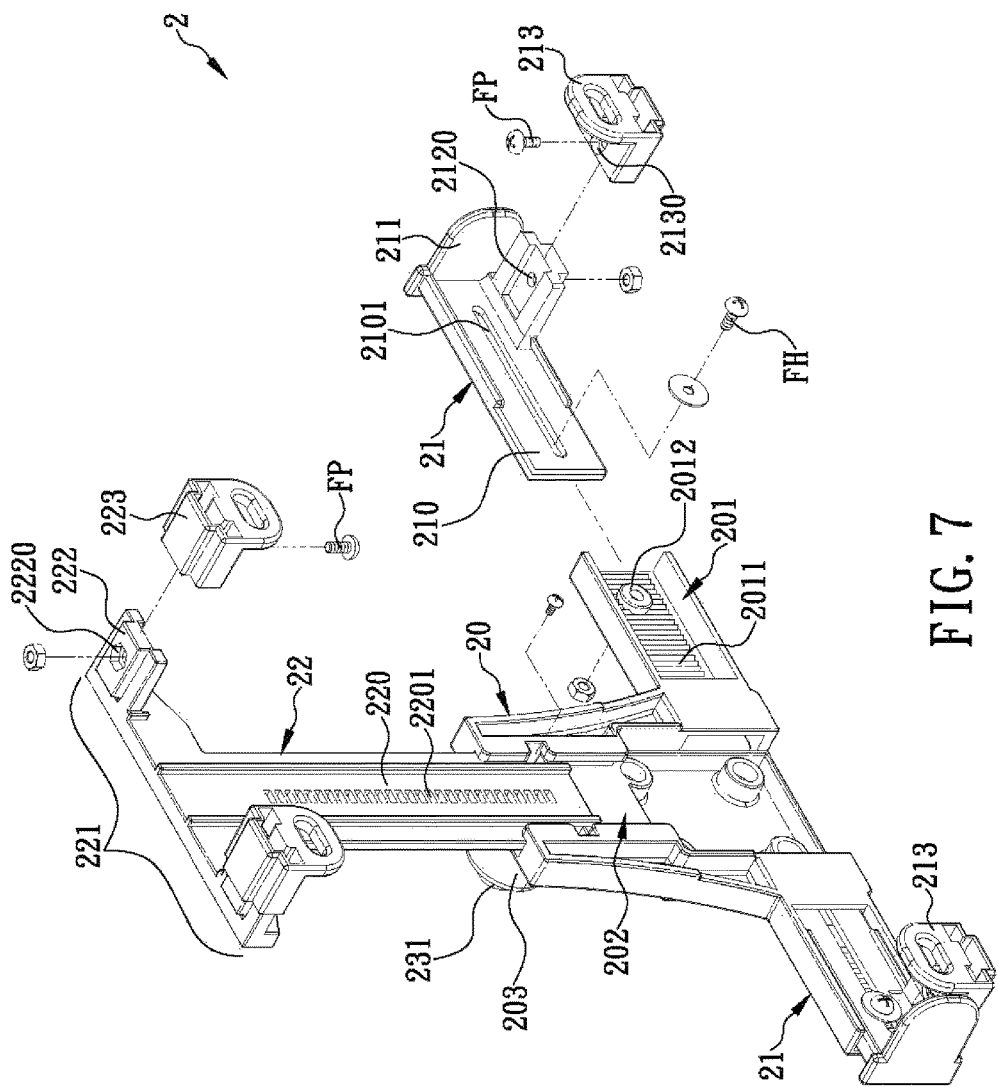
FIG. 7 is a partially exploded front perspective view of the bracket in FIG. 5.

In this preferred embodiment of the invention, as shown in FIGS. 5, 6, and 7, the vertically clamping member 22 includes a vertical rail member 220, two vertically positioning posts 222, and two vertically blocking front members 223. The vertical rail member 220 is horizontally provided with a front blocking arm 221 at one end and can be inserted vertically into the vertical rail groove 202 to any depth desired and be fixed in the vertical rail groove 202, with the front blocking arm 221 exposed from one end of the vertical rail groove 202. Each vertically positioning post 222 is perpendicularly and fixedly provided on the front side of the front blocking arm 221 and is adjacent to one end of the front blocking arm 221. Each vertically blocking front member 223 can be fitted horizontally over the corresponding vertically positioning post 222 to any depth desired and be fixed to the corresponding vertically positioning post 222.

Once a tablet-type electronic device to be supported on the bracket 2 has its bottom edge supported by the two horizontally positioning posts 212 and its two horizontally corresponding lateral edges (e.g., the left and right edges) held by the two horizontally blocking lateral members 211 respectively, the vertical distance between the vertically blocking front members 223 and the horizontally blocking front members 213 is adjusted until a perfect match with the vertical height of the tablet-type electronic device is obtained, allowing the vertically blocking front members 223 to hold the top edge and the top front edge of the tablet-type electronic device; thus, the tablet-type electronic device is securely positioned on the bracket 2.

Referring to FIG. 7, in order for the horizontal rail member 210 of each horizontally clamping member 21 to be horizontally insertable into the corresponding horizontal rail groove 201 to any depth desired and be fixed in the corresponding horizontal rail groove 201 without wobbling or getting loose, thereby ensuring that the distance B between the two horizontally blocking lateral members 211 will always match the horizontal width of the bottom edge of the tablet-type electronic device to be supported, and that the two horizontally blocking lateral members 211 will maintain a firm hold on two horizontally corresponding lateral edges (e.g., the left and right edges) of the tablet-type electronic device respectively, hence allowing tablet-type electronic devices of different sizes to be positioned safely and securely on the bracket 2 for use in challenging environments, the bracket 2 in this preferred embodiment of the invention has the following additional features. With continued reference to FIG. 7, the horizontal rail member 210 of each horizontally clamping member 21 is horizontally formed with a lateral-position adjustment slot 2101, the inner wall of each horizontal rail groove 201 is provided with a bolt fixing base 2012 corresponding in position to the corresponding lateral-position adjustment slot 2101, and the corresponding walls of each horizontal rail groove 201 and of the corresponding horizontal rail member 210 are each provided with a meshing surface 2011. (Please note that FIG. 7 shows only the meshing surface 2011 on the inner wall of the horizontal rail groove 201 but not the meshing surface on the backside of the horizontal rail member 210.) When a tablet-type electronic device is to be supported on the bracket 2 for the first time, it is necessary to adjust the distance between the two horizontally clamping members 21 so that the distance B between the two horizontally blocking lateral members 211 matches the horizontal width of the bottom edge of the tablet-type electronic device perfectly. Then, two horizontal positioning bolts $F_H$ are respectively passed through the lateral-position adjustment slots 2101 and locked to the bolt fixing bases 2012, with the meshing surfaces 2011 of each corresponding pair of horizontal rail groove 201 and horizontal rail member 210 meshing with each other as a result. Thus, each horizontal rail member 210 is inserted horizontally into the corresponding horizontal rail groove 201 to the desired depth and fixed in the corresponding horizontal rail groove 201 to form a single unit therewith, with the two horizontally blocking lateral members 211 keeping a firm hold on two horizontally corresponding lateral edges (e.g., the left and right edges) of the tablet-type electronic device respectively, preventing the tablet-type electronic device from wobbling or getting loose from the bracket 2, thereby ensuring the stability and safety of use of the tablet-type electronic device in any challenging environment.

Figure 8:
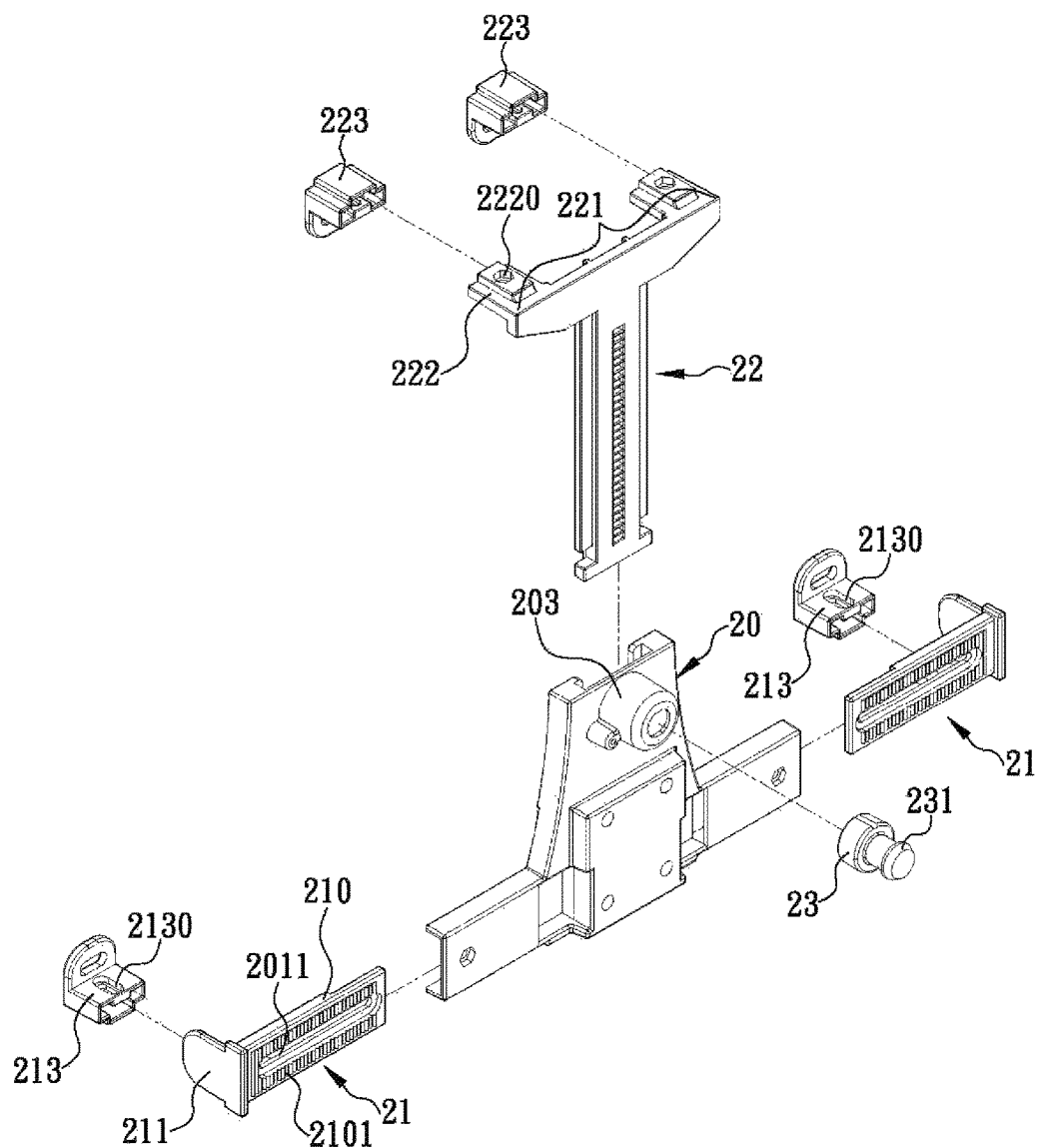
FIG. 8 is an exploded rear perspective view of the bracket in FIG. 5.
Figure 9:
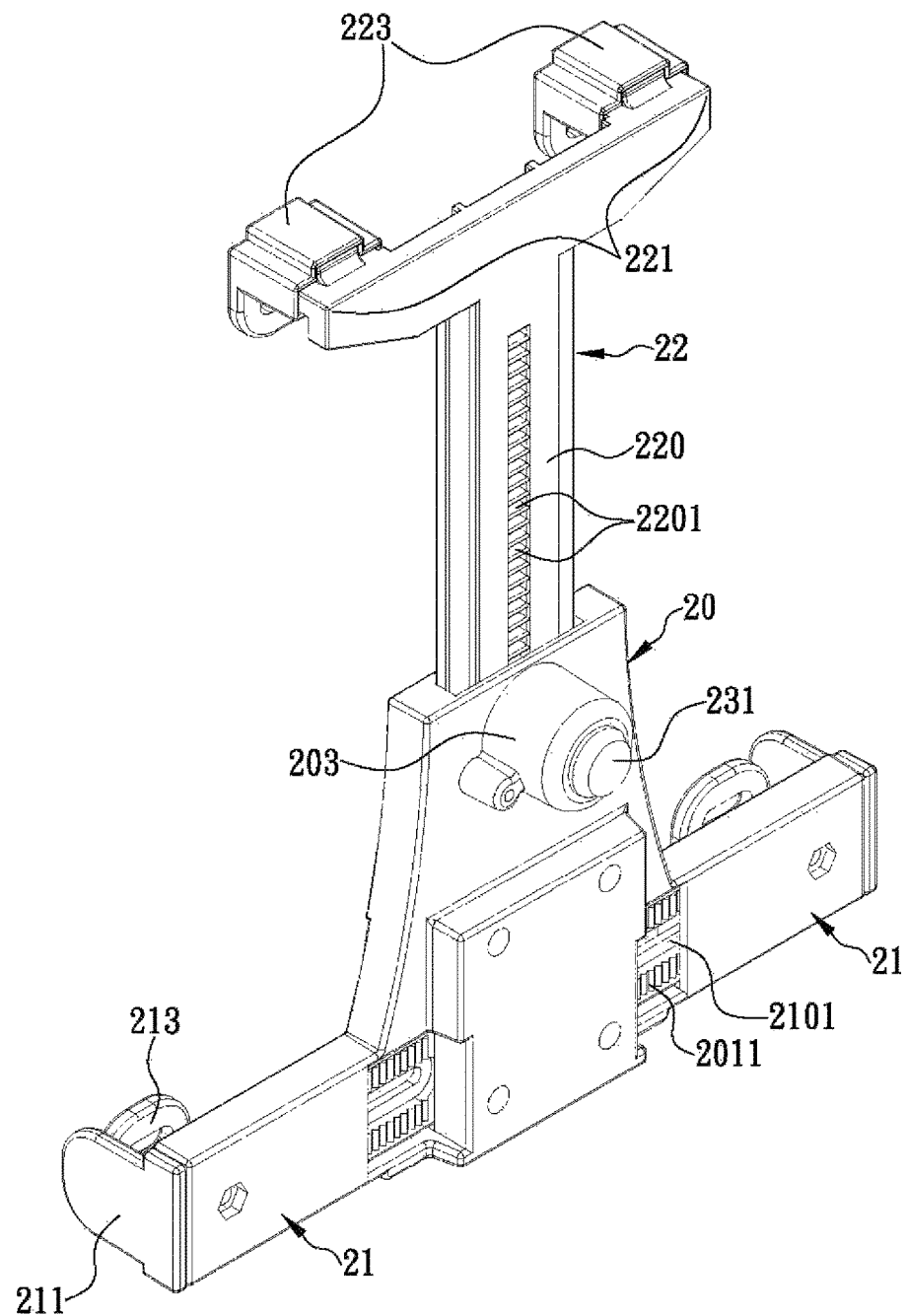
FIG. 9 is an assembled rear perspective view of the bracket in FIG. 5.
Figure 10:
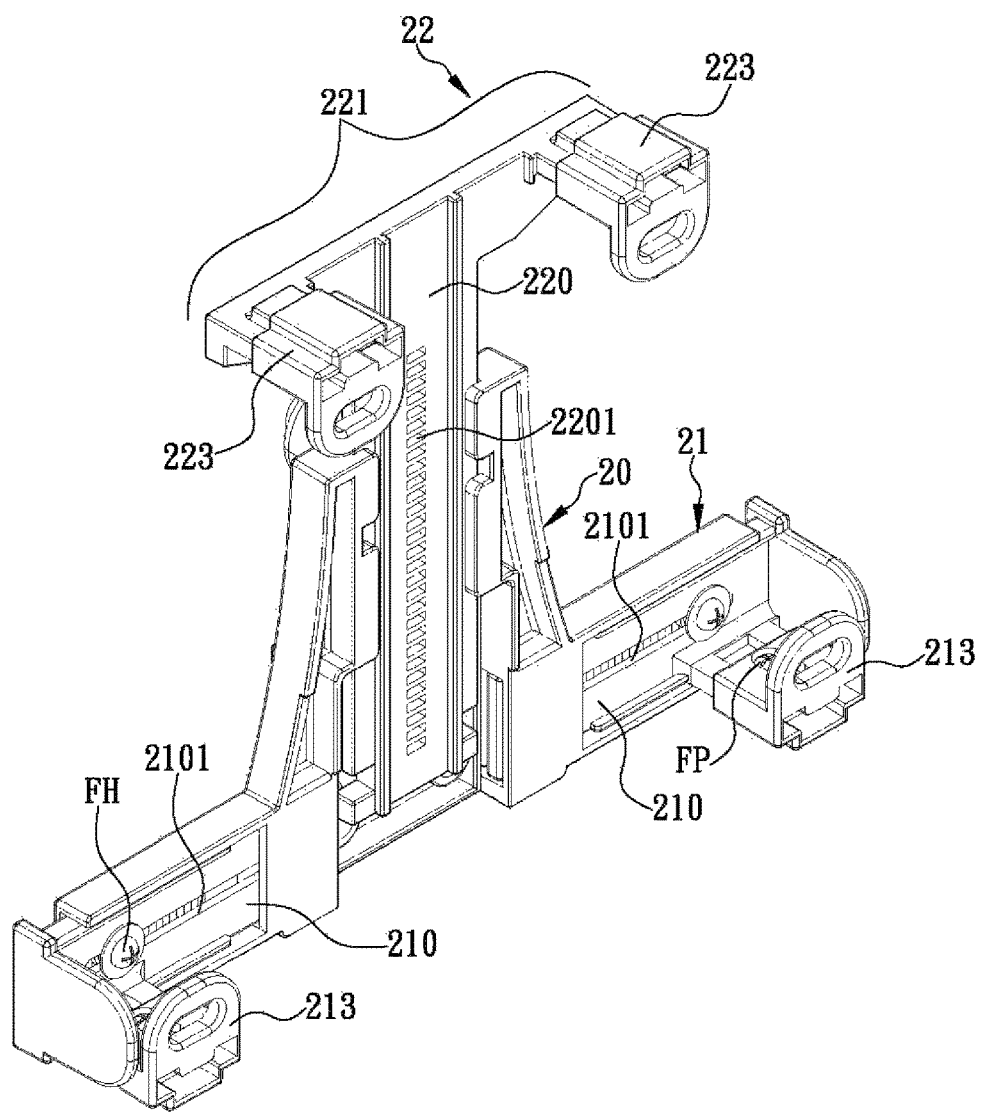
FIG. 10 is another assembled front perspective view of the bracket in FIG. 5.
Figure 11:
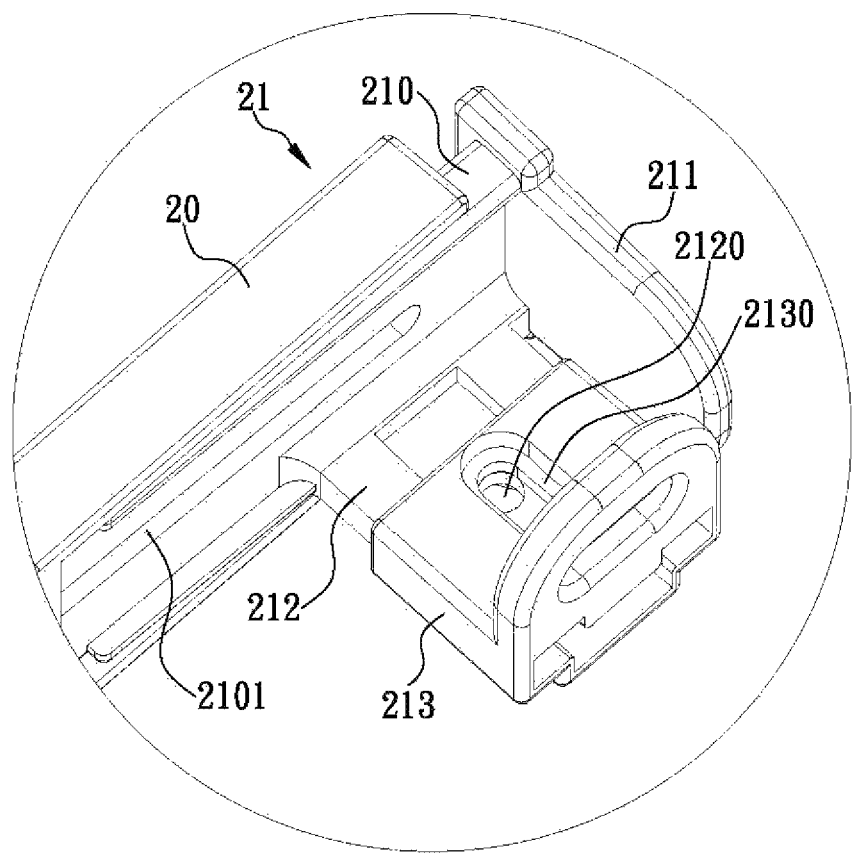
FIG. 11 is a top view of a horizontally blocking front member of the bracket in FIG. 5.
Figure 12:
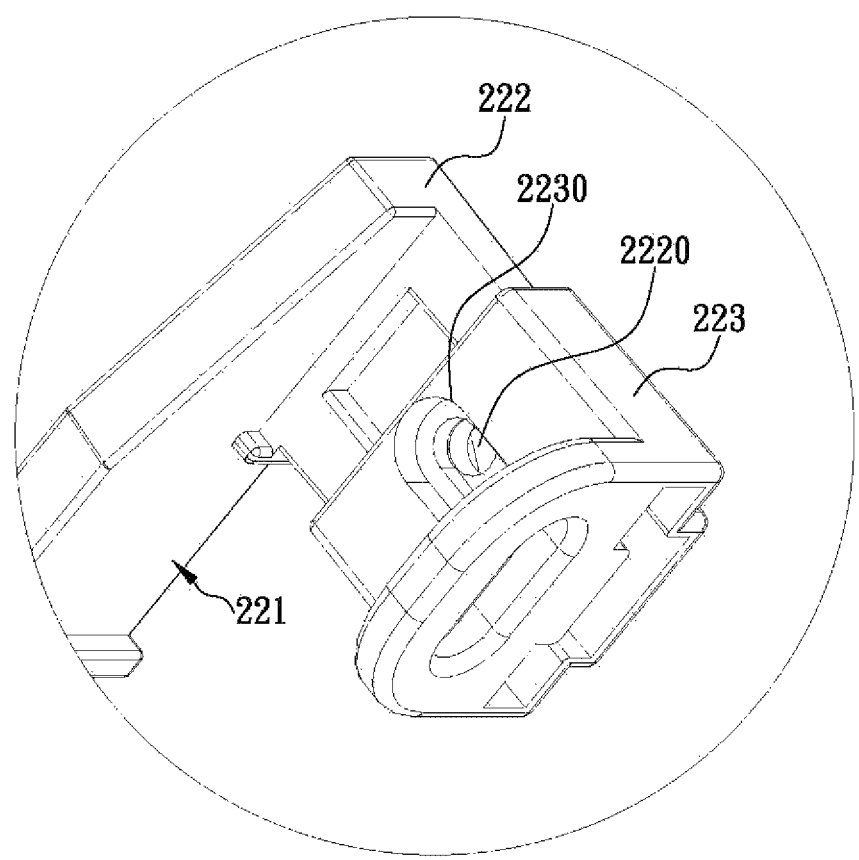
FIG. 12 is a bottom view of a vertically blocking front member of the bracket in FIG. 5.

Referring to FIGS. 5 and 8, the backside of the bracket base 20 is further protrudingly provided with a lock base 203 adjacent to the center of the backside of the bracket base 20 so that a tablet-type electronic device securely positioned on the bracket 2 cannot be easily stolen. The lock base 203 is provided therein with a lock 23. The lock 23 is protrudingly provided with a locking press-button 231 extending away from the backside of the bracket base 20. The locking press-button 231 can be pressed into the lock base 203 with a finger, thereby moving a lock plate 230 in the lock 23 toward the front side of the bracket base 20 until the lock plate 230 is exposed from the lock 23. The vertical rail member 220, on the other hand, is formed with a plurality of locking holes 2201 that are vertically arranged and correspond in position to the lock plate 230. Referring to FIGS. 9 and 10, once a tablet-type electronic device is positioned securely on the bracket 2, the user can press the locking press-button 231 with a finger, and the lock plate 230 will be moved toward the front side of the bracket base 20, exposed from the lock 23, and eventually engaged in the corresponding locking hole 2201 of the vertical rail member 220, making it impossible for the front blocking arm 221 and the vertically blocking front members 223 thereon to move vertically. Thus, the tablet-type electronic device enters a locked state, in which the tablet-type electronic device is locked to and cannot be separated from the bracket 2 and is therefore protected against stealing. When it is desired to detach the tablet-type electronic device from the bracket 2, the locking press-button 231 is pressed again, or the lock 23 is unlocked with a key (not shown), in order to retract the lock plate 230 into the lock 23, allowing the front blocking arm 221 and the vertically blocking front members 223 thereon to move vertically and thereby bring the tablet-type electronic device into a released state, in which the tablet-type electronic device can be separated from the bracket 2.

Referring to FIGS. 5, 6, 7, and 11, in order for each horizontally blocking front member 213 and each vertically blocking front member 223 to be horizontally mountable over the corresponding horizontally positioning post 212 and the corresponding vertically positioning post 222 respectively to any depth desired and be fixed to the corresponding horizontally positioning post 212 and the corresponding vertically positioning post 222 respectively without wobbling or getting loose, thereby ensuring that the horizontally blocking front members 213 and the vertically blocking front members 223 will always correspond to the thickness of the to-be-supported tablet-type electronic device in the fore-and-aft direction, and that the horizontally blocking front members 213 and the vertically blocking front members 223 will maintain a firm hold on corresponding portions (e.g., a bottom-left and a bottom-right front edge portion, and a top-left and a top-right front edge portion) of the tablet-type electronic device respectively, hence allowing tablet-type electronic devices of different sizes to be positioned safely and securely on the bracket 2 for use in challenging environments, the bracket 2 in this preferred embodiment of the invention has the following additional features. Referring to FIGS. 5, 6, 7, 11, and 12, each horizontally blocking front member 213 is formed with a fore-and-aft-position adjustment slot 2130 extending in the fore-and-aft direction, each horizontally positioning post 212 is provided with a bolt fixing base 2120 corresponding in position to the corresponding fore-and-aft-position adjustment slot 2130, each vertically blocking front member 223 is formed with a fore-and-aft-position adjustment slot 2230 extending in the fore-and-aft direction, and each vertically positioning post 222 is provided with a bolt fixing base 2220 corresponding in position to the corresponding fore-and-aft-position adjustment slot 2230. When a tablet-type electronic device is to be supported on the bracket 2 for the first time, referring back to FIGS. 9 and 10, it is necessary to adjust the position of each horizontally blocking front member 213 on the corresponding horizontally positioning post 212 and the position of each vertically blocking front member 223 on the corresponding vertically positioning post 222 so that the positions of the horizontally blocking front members 213 and the positions of the vertically blocking front members 223 correspond precisely to the bottom edge thickness and the top edge thickness of the tablet-type electronic device respectively. Then, four vertical positioning bolts $F_P$ are respectively passed through the fore-and-aft-position adjustment slots 2130, 2230 and locked to the bolt fixing bases 2120, 2220. Thus, each horizontally blocking front member 213 is fitted horizontally over the corresponding horizontally positioning post 212 to the desired depth and fixed to the corresponding horizontally positioning post 212 to form a single unit therewith, and each vertically blocking front member 223 is fitted horizontally over the corresponding vertically positioning post 222 to the desired depth and fixed to the corresponding vertically positioning post 222 to form a single unit therewith. The horizontally blocking front members 213 and the vertically blocking front members 223 will keep a firm hold on corresponding portions of the bottom and top edges of the tablet-type electronic device (e.g., a bottom-left and a bottom-right front edge portion, and a top-left and a top-right front edge portion) respectively, preventing the tablet-type electronic device from wobbling or getting loose from the bracket 2, thereby ensuring the stability and safety of use of the tablet-type electronic device in any challenging environment.

The foregoing is only a couple of embodiments of the present invention. A person skilled in the art may modify or change the disclosed embodiments in many ways according to the disclosure of the present specification without departing from the scope of the invention.

What is claimed is:
1. A bracket for holding and locking tablet-type electronic devices of various sizes securely, comprising:
a bracket base of an inverted T shape, wherein the bracket base has a front side and a backside, the front side is concavely provided with two horizontal rail grooves and a vertical rail groove, the horizontal rail grooves are adjacent to a bottom side of the bracket base and to two corresponding lateral edges of the bracket base respectively, the vertical rail groove is adjacent to a top side and a center of the bracket base and is perpendicularly connected to and in communication with the horizontal rail grooves, and the backside has a central portion connectable to a supporting leg so that the bracket base is mountable on a plane or an object in an angularly adjustable manner through the supporting leg;

two horizontally clamping members each comprising a horizontal rail member, a horizontally positioning post, and a horizontally blocking front member, wherein each said horizontal rail member has an end provided with a horizontally blocking lateral member, each said horizontal rail member is horizontally insertable into a corresponding said horizontal rail groove to any depth desired and is fixable in the corresponding horizontal rail groove such that a corresponding said horizontally blocking lateral member is exposed from an end of the corresponding horizontal rail groove, each said horizontally positioning post is perpendicularly and fixedly provided on a front side of a corresponding said horizontal rail member at a position adjacent to a bottom edge of the end of the corresponding horizontal rail member, and each said horizontally blocking front member is able to be fitted horizontally over a corresponding said horizontally positioning post to any depth desired and be fixed to the corresponding horizontally positioning post; and wherein when a said tablet-type electronic device is supported on the bracket, a distance between the two horizontally blocking lateral members is adjustable until matching a horizontal width of a bottom edge of the tablet-type electronic device, in order for the two horizontally positioning posts to support the bottom edge of the tablet-type electronic device, for the two horizontally blocking lateral members to hold two horizontally corresponding lateral edges of the tablet-type electronic device respectively, and for the two horizontally blocking front members to hold two corresponding front portions of the tablet-type electronic device respectively; and a vertically clamping member comprising a vertical rail member, two vertically positioning posts, and two vertically blocking front members, wherein the vertical rail member has an end horizontally provided with a front blocking arm, the vertical rail member is vertically insertable into the vertical rail groove to any depth desired and is fixable in the vertical rail groove such that the front blocking arm is exposed from an end of the vertical rail groove, each said vertically positioning post is perpendicularly and fixedly provided on a front side of the front blocking arm at a position adjacent to an end of the front blocking arm, and each said vertically blocking front member is able to be fitted horizontally over a corresponding said vertically positioning post to any depth desired and be fixed to the corresponding vertically positioning post; and wherein when the bottom edge of the tablet-type electronic device is supported by the two horizontally positioning posts, and the two horizontally corresponding lateral edges of the tablet-type electronic device are held by the two horizontally blocking lateral members respectively, the vertically blocking front members are vertically adjustable until a vertical distance therefrom to the horizontally blocking front members matches a vertical height of the tablet-type electronic device, in order for the vertically blocking front members to hold a top edge and a top front edge of the tablet-type electronic device, thereby positioning the tablet-type electronic device securely on the bracket.

2. The bracket of claim 1, wherein the horizontal rail member of each said horizontally clamping member is horizontally formed with a lateral-position adjustment slot, and each said horizontal rail groove has an inner wall provided with a bolt fixing base corresponding in position to a corresponding said lateral-position adjustment slot so that, once the tablet-type electronic device is supported by the bracket, and a distance between the two horizontally clamping members is adjusted such that the distance between the two horizontally blocking lateral members matches the horizontal width of the bottom edge of the tablet-type electronic device, two horizontal positioning bolts are respectively passable through the lateral-position adjustment slots and lockable to the bolt fixing bases, thereby allowing each said horizontal rail member to be inserted horizontally into the corresponding horizontal rail groove to any depth desired and be fixed to the corresponding horizontal rail groove to form a single unit therewith, in order for the two horizontally blocking lateral members to keep a firm hold on the two horizontally corresponding lateral edges of the tablet-type electronic device respectively and prevent the tablet-type electronic device from getting loose from the bracket when the tablet-type electronic device is shaken.

3. The bracket of claim 2, wherein each said horizontal rail member and the corresponding horizontal rail groove have corresponding walls each provided with a meshing surface so that, once the tablet-type electronic device is supported by the bracket, and the distance between the two horizontally clamping members is adjusted such that the distance between the two horizontally blocking lateral members matches the horizontal width of the bottom edge of the tablet-type electronic device, the two horizontal positioning bolts are respectively passable through the lateral-position adjustment slots and lockable to the bolt fixing bases to cause corresponding said meshing surfaces of each said horizontal rail member and of the corresponding horizontal rail groove to mesh with each other, thereby allowing each said horizontal rail member to be inserted horizontally into the corresponding horizontal rail groove to any depth desired and be fixed to the corresponding horizontal rail groove to form a single unit therewith, in order for the two horizontally blocking lateral members to keep a firm hold on the two horizontally corresponding lateral edges of the tablet-type electronic device respectively and prevent the tablet-type electronic device from getting loose from the bracket when the tablet-type electronic device is shaken.

4. The bracket of claim 1, wherein the backside of the bracket base is protrudingly provided with a lock base adjacent to the central portion of the backside of the bracket base; the lock base is provided therein with a lock; the lock is protrudingly provided with a locking press-button extending away from the backside of the bracket base; the locking press-button is retracted into the lock base when pressed with a finger such that a lock plate in the lock is moved toward the front side of the bracket base and exposed from the lock; the vertical rail member is formed with a plurality of locking holes; the locking holes are vertically arranged and correspond in position to the lock plate; and when the tablet-type electronic device is securely positioned on the bracket, the locking press-button is pressable with a finger in order for the lock plate to move toward the front side of the bracket base, be exposed from the lock, and engage with a corresponding said locking hole of the vertical rail member, thereby preventing vertical movement of the front blocking arm and of the vertically blocking front members and bringing the tablet-type electronic device into a locked state, in which the tablet-type electronic device is locked to and inseparable from the bracket.

5. The bracket of claim 2, wherein the backside of the bracket base is protrudingly provided with a lock base adjacent to the central portion of the backside of the bracket base; the lock base is provided therein with a lock; the lock is protrudingly provided with a locking press-button extending away from the backside of the bracket base; the locking press-button is retracted into the lock base when pressed with a finger such that a lock plate in the lock is moved toward the front side of the bracket base and exposed from the lock; the vertical rail member is formed with a plurality of locking holes; the locking holes are vertically arranged and correspond in position to the lock plate; and when the tablet-type electronic device is securely positioned on the bracket, the locking press-button is pressable with a finger in order for the lock plate to move toward the front side of the bracket base, be exposed from the lock, and engage with a corresponding said locking hole of the vertical rail member, thereby preventing vertical movement of the front blocking arm and of the vertically blocking front members and bringing the tablet-type electronic device into a locked state, in which the tablet-type electronic device is locked to and inseparable from the bracket.

6. The bracket of claim 3, wherein the backside of the bracket base is protrudingly provided with a lock base adjacent to the central portion of the backside of the bracket base; the lock base is provided therein with a lock; the lock is protrudingly provided with a locking press-button extending away from the backside of the bracket base; the locking press-button is retracted into the lock base when pressed with a finger such that a lock plate in the lock is moved toward the front side of the bracket base and exposed from the lock; the vertical rail member is formed with a plurality of locking holes; the locking holes are vertically arranged and correspond in position to the lock plate; and when the tablet-type electronic device is securely positioned on the bracket, the locking press-button is pressable with a finger in order for the lock plate to move toward the front side of the bracket base, be exposed from the lock, and engage with a corresponding said locking hole of the vertical rail member, thereby preventing vertical movement of the front blocking arm and of the vertically blocking front members and bringing the tablet-type electronic device into a locked state, in which the tablet-type electronic device is locked to and inseparable from the bracket.

7. The bracket of claim 4, wherein the lock is unlockable by pressing the locking press-button again so that the lock plate is retracted into the lock, allowing the front blocking arm and the vertically blocking front members thereon to be moved vertically to bring the tablet-type electronic device into a released state.

8. The bracket of claim 5, wherein the lock is unlockable by pressing the locking press-button again so that the lock plate is retracted into the lock, allowing the front blocking arm and the vertically blocking front members thereon to be moved vertically to bring the tablet-type electronic device into a released state.

9. The bracket of claim 6, wherein the lock is unlockable by pressing the locking press-button again so that the lock plate is retracted into the lock, allowing the front blocking arm and the vertically blocking front members thereon to be moved vertically to bring the tablet-type electronic device into a released state.

10. The bracket of claim 4, wherein the lock is unlockable with a key so that the lock plate is retracted into the lock, allowing the front blocking arm and the vertically blocking front members thereon to be moved vertically to bring the tablet-type electronic device into a released state.

11. The bracket of claim 5, wherein the lock is unlockable with a key so that the lock plate is retracted into the lock, allowing the front blocking arm and the vertically blocking front members thereon to be moved vertically to bring the tablet-type electronic device into a released state.

12. The bracket of claim 6, wherein the lock is unlockable with a key so that the lock plate is retracted into the lock, allowing the front blocking arm and the vertically blocking front members thereon to be moved vertically to bring the tablet-type electronic device into a released state.

13. The bracket of claim 4, wherein each said horizontally blocking front member is formed with a fore-and-aft-position adjustment slot in a fore-and-aft direction, and each said horizontally positioning post is provided with a bolt fixing base corresponding in position to a corresponding said fore-and-aft-position adjustment slot so that, once the tablet-type electronic device is supported by the bracket, and the horizontally blocking front members are adjusted in position with respect to the horizontally positioning posts respectively and consequently correspond to a thickness of the bottom edge of the tablet-type electronic device in the fore-and-aft direction, two vertical positioning bolts are respectively passable through the fore-and-aft-position adjustment slots and lockable to the bolt fixing bases of the horizontally positioning posts, thereby allowing each said horizontally blocking front member to be fitted horizontally over the corresponding horizontally positioning post to any depth desired and be fixed to the corresponding horizontally positioning post to form a single unit therewith, in order for the horizontally blocking front members to keep a firm hold on the two corresponding front portions of the tablet-type electronic device respectively and prevent the tablet-type electronic device from getting loose from the bracket when the tablet-type electronic device is shaken.

14. The bracket of claim 5, wherein each said horizontally blocking front member is formed with a fore-and-aft-position adjustment slot in a fore-and-aft direction, and each said horizontally positioning post is provided with a bolt fixing base corresponding in position to a corresponding said fore-and-aft-position adjustment slot so that, once the tablet-type electronic device is supported by the bracket, and the horizontally blocking front members are adjusted in position with respect to the horizontally positioning posts respectively and consequently correspond to a thickness of the bottom edge of the tablet-type electronic device in the fore-and-aft direction, two vertical positioning bolts are respectively passable through the fore-and-aft-position adjustment slots and lockable to the bolt fixing bases of the horizontally positioning posts, thereby allowing each said horizontally blocking front member to be fitted horizontally over the corresponding horizontally positioning post to any depth desired and be fixed to the corresponding horizontally positioning post to form a single unit therewith, in order for the horizontally blocking front members to keep a firm hold on the two corresponding front portions of the tablet-type electronic device respectively and prevent the tablet-type electronic device from getting loose from the bracket when the tablet-type electronic device is shaken.

15. The bracket of claim 6, wherein each said horizontally blocking front member is formed with a fore-and-aft-position adjustment slot in a fore-and-aft direction, and each said horizontally positioning post is provided with a bolt fixing base corresponding in position to a corresponding said fore-and-aft-position adjustment slot so that, once the tablet-type electronic device is supported by the bracket, and the horizontally blocking front members are adjusted in position with respect to the horizontally positioning posts respectively and consequently correspond to a thickness of the bottom edge of the tablet-type electronic device in the fore-and-aft direction, two vertical positioning bolts are respectively passable through the fore-and-aft-position adjustment slots and lockable to the bolt fixing bases of the horizontally positioning posts, thereby allowing each said horizontally blocking front member to be fitted horizontally over the corresponding horizontally positioning post to any depth desired and be fixed to the corresponding horizontally positioning post to form a single unit therewith, in order for the horizontally blocking front members to keep a firm hold on the two corresponding front portions of the tablet-type electronic device respectively and prevent the tablet-type electronic device from getting loose from the bracket when the tablet-type electronic device is shaken.

16. The bracket of claim 4, wherein each said vertically blocking front member is formed with a fore-and-aft-position adjustment slot in a fore-and-aft direction, and each said vertically positioning post is provided with a bolt fixing base corresponding in position to a corresponding said fore-and-aft-position adjustment slot so that, once the tablet-type electronic device is supported by the bracket, and the vertically blocking front members are adjusted in position with respect to the vertically positioning posts respectively and consequently correspond to a thickness of the top edge of the tablet-type electronic device in the fore-and-aft direction, two vertical positioning bolts are respectively passable through the fore-and-aft-position adjustment slots and lockable to the bolt fixing bases of the vertically positioning posts, thereby allowing each said vertically blocking front member to be fitted horizontally over the corresponding vertically positioning post to any depth desired and be fixed to the corresponding vertically positioning post to form a single unit therewith, in order for the vertically blocking front members to keep a firm hold on corresponding front portions of the tablet-type electronic device respectively and prevent the tablet-type electronic device from getting loose from the bracket when the tablet-type electronic device is shaken.

17. The bracket of claim 5, wherein each said vertically blocking front member is formed with a fore-and-aft-position adjustment slot in a fore-and-aft direction, and each said vertically positioning post is provided with a bolt fixing base corresponding in position to a corresponding said fore-and-aft-position adjustment slot so that, once the tablet-type electronic device is supported by the bracket, and the vertically blocking front members are adjusted in position with respect to the vertically positioning posts respectively and consequently correspond to a thickness of the top edge of the tablet-type electronic device in the fore-and-aft direction, two vertical positioning bolts are respectively passable through the fore-and-aft-position adjustment slots and lockable to the bolt fixing bases of the vertically positioning posts, thereby allowing each said vertically blocking front member to be fitted horizontally over the corresponding vertically positioning post to any depth desired and be fixed to the corresponding vertically positioning post to form a single unit therewith, in order for the vertically blocking front members to keep a firm hold on corresponding front portions of the tablet-type electronic device respectively and prevent the tablet-type electronic device from getting loose from the bracket when the tablet-type electronic device is shaken.

18. The bracket of claim 6, wherein each said vertically blocking front member is formed with a fore-and-aft-position adjustment slot in a fore-and-aft direction, and each said vertically positioning post is provided with a bolt fixing base corresponding in position to a corresponding said fore-and-aft-position adjustment slot so that, once the tablet-type electronic device is supported by the bracket, and the vertically blocking front members are adjusted in position with respect to the vertically positioning posts respectively and consequently correspond to a thickness of the top edge of the tablet-type electronic device in the fore-and-aft direction, two vertical positioning bolts are respectively passable through the fore-and-aft-position adjustment slots and lockable to the bolt fixing bases of the vertically positioning posts, thereby allowing each said vertically blocking front member to be fitted horizontally over the corresponding vertically positioning post to any depth desired and be fixed to the corresponding vertically positioning post to form a single unit therewith, in order for the vertically blocking front members to keep a firm hold on corresponding front portions of the tablet-type electronic device respectively and prevent the tablet-type electronic device from getting loose from the bracket when the tablet-type electronic device is shaken.

\* \* \* \* \*